Feb. 13, 1973  YASUSHI TOTSUKA ET AL  3,716,839
AUTOMATIC MEASURING AND RECORDING DEVICE
Filed March 15, 1971  3 Sheets-Sheet 1

INVENTORS
YASUSHI TOTSUKA
SHIN-ICHI KAMACHI
BY
Kurt Kelman
AGENT

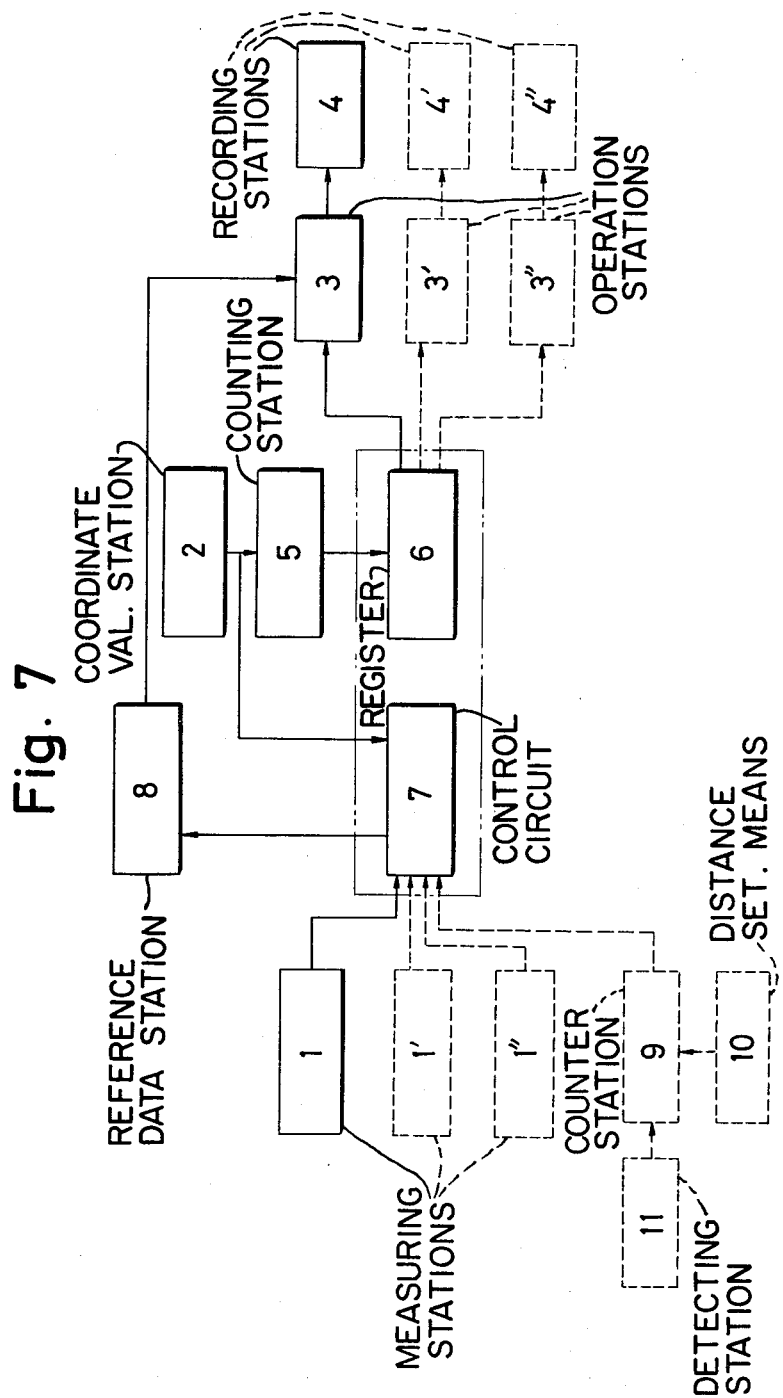

# United States Patent Office 3,716,839
Patented Feb. 13, 1973

3,716,839
AUTOMATIC MEASURING AND RECORDING DEVICE
Yasushi Totsuka and Shin-ichi Kamachi, Tokyo, Japan, assignors to Olympus Optical Co., Ltd., Tokyo, Japan
Continuation-in-part of application Ser. No. 854,832, Sept. 3, 1969. This application Mar. 15, 1971, Ser. No. 124,262
Claims priority, application Japan, Sept. 4, 1968, 43/62,998
Int. Cl. G01b 11/00
U.S. Cl. 340—172.5    4 Claims

ABSTRACT OF THE DISCLOSURE

Automatic measuring and recording device capable of successively measuring and recording the errors or the deviations of measured values such as the length and the angle relating to an object from the reference data given in the respective measurements without stopping the device. The device comprises a counting station for counting pulses supplied from a digital coordinate value detecting station so as to generate pulses indicative of the coordinate value to be measured, a register connected to the counting station and capable of temporarily storing the content obtained in the counting station, a control circuit for receiving a pulse from a measuring point detecting station so as to generate a memorization instructing pulse as well as an operation and recording instructing pulse in synchronism with the pulses counted in the counting station, an operation station and a recording station connected to the register and the control circuit, a reference data setting station connected to the control circuit and the operation station, the control circuit being connected to the digital coordinate value detecting station as well as the register, the reference data setting station supplying the reference datum to the operation station each time the control circuit supplies a pulse to the reference data setting station. The register receives the content of the counting station at the moment the memorization instructing pulse from the control circuit is applied thereto during the time the counting station continues the counting operation so as to temporarily store the content of the counting station. The content stored in the register is transferred to the operation station while the reference datum is supplied thereto from the reference data setting station by the application of the operation and memorization instructing pulse from the control circuit within the time period until the next pulse is supplied from the measuring point detecting station so that the content transferred from the register is compared with the reference datum to provide the deviation of the measured value in the object from the reference datum. The thus obtained deviation is successively recorded in the recording station by the operation and recording instructing pulse.

CROSS REFERENCE TO RELATED APPLICATION

This application is a continuation-in-part application of U.S. patent application Ser. No. 854,832, filed Sept. 3, 1969, and now abandoned by the same inventors as those of this application.

BACKGROUND OF THE INVENTION

The present invention relates to an automatic digital measuring and recording device of the error or the deviation of the measured value such as the length and the angle with respect to an object from the reference datum desired to be given to the object. The present invention relates particularly to a control circuit adapted to be incorporated in the digital measuring and recording device for carrying out fully automatically a series of operations by means of a measuring point detecting station and operation and recording stations incorporated in the measuring and recording device.

The automatic measurement referred to in this specification means that the device is automatically operated for all procedures beginning at the measuring step and ending at the recording step without stopping the device. For convenience to the description of the invention, a well known toolmaker's microscope is selected as an example of the measuring device and the measuring procedures of the toolmaker's microscope are analyzed for the understanding of the present invention. Then, the procedures are classified into following four operations:

(1) Detection of the measuring point (reference point)

This procedure is carried out by observing the field of view of the microscope and determining the position of an object at which the measurement is to be commenced in cooperation with a reference index such as a reticule provided in the field of view of the microscope.

(2) Reading out the coordinate value relating to the measurement

This procedure is carried out by reading the scale or detecting the amount of the movement of the lead screw mounted on the microscope.

(3) Operation of the measured value

This procedure is carried out by computing the data of the measurement in comparison with the design data or the reference data desired to be given to the object.

(4) Recording

This procedure is carried out by recording the computed data on a predetermined recording paper.

The characteristic features of the measuring and recording procedures as described above are:
The table of the measuring instrument on which the object is carried must be stopped each time the measuring point is to be detected.
The operation and/or the recording operation are in general carried out separately from the detecting procedure of the measuring point and the read-out procedure of the coordinate value after they have been completed. Heretofore, various devices have been developed for automatically carrying out each of the above described four procedures.

For instance, a device provided with a photoelectric element has been developed for detecting the measuring point. A digital measuring device provided with moiré fringe detecting means has also been developed for reading out the coordinate value. As to the operation procedure of the measured data and the recording of the computed data, various devices known as electronic computers have been developed.

Considering the relationship between the electric output signals obtained by each of the above described devices in the lapse of time, the detecting signal of the measuring point as referred to in item (1) above is generated at the moment the measuring point is detected by the detecting device, therefore, the generation of the detecting signal is determined only by the relative positional relationship between the object to be measured and the detecting device. The read-out value of the coordinate value is determined by the position of the graduation in a scale used in the measurement of the length or the angle (diffraction grating, in case of moiré fringe detecting means). The above two procedures all relate to the mechanical construction of the measuring devices used, and no correlation exists between the above two with respect to the time at which the signal is generated, although the signals are obtained by the operation of each of the measuring devices with the lapse of time. As to the operation of the device referred to item (3) above, means for generating clock pulses, i.e., timing pulses is in general incorporated in the operation device, and all the functions of the device are synchronized by utilizing the clock pulses as the reference value with respect to the lapse of time. And the recording device referred to item (4) above commences its recording operation by the recording instructing signal supplied thereto from the exterior of the device and issues a signal when the recording is completed in order to inform the completion of the recording. Within the time period between the supply of the recording instructing signal and the issuance of the signal informing the completion of the recording, the data in the device which are to be recorded must be kept to be constant determined values.

From the above, it is evident that the above described four procedures referred to items (1)–(4) above each required for the automatic measurement are carried out quite independently from each other without requiring any correlation therebetween, therefore, it is necessary to combine them with each other so that they are operated in synchronized relationship with each other with the lapse of time in order to obtain fully automatized measurement and the recording of the measured data.

However, an automatic measuring and recording device capable of carrying out the above described fully synchronized automatized measurement and recording of the data has not been developed.

The present invention aims at providing an automatic digital measuring and recording device capable of carrying out fully automatized measurement and recording of the error or the deviation of the measured data relating to an object from the reference data desired to be given to the object which have not been able to be achieved by the prior art measuring and recording devices.

SUMMARY OF THE INVENTION

An object of the present invention is to provide a novel and useful automatic measuring and recording device which avoids the difficulties in the prior art measuring and recording device.

Another object of the present invention is to provide a novel and useful measuring and recording device of the type described above in which the discontinuity of the procedures for the measurement and the recording is avoided and by which fully continuous operations for the measurement and the recording can be carried out.

To achieve the above objects, the automatic measuring and recording device constructed in accordance with the present invention is characterized by the provision of a counting station adapted to count pulses supplied from a digital coordinate value detecting station connected thereto and generating pulses indicative of the coordinate value such as the length and the angle to be measured with respect to an object, a register operatively connected to the counting station and adapted to temporarily memorize the content obtained in the counting station, a control circuit adapted to receive a pulse from a measuring point detecting station connected thereto so as to generate a memorization instructing pulse as well as an operation and recording instructing pulse in synchronism with the pulses counted in the counting station each time the measuring point detecting station detects the successive measuring points, an operation station connected to the register and a recording station connected to the operation station, a reference data setting station connected to the control circuit and the operation station for supplying the reference datum desired to be given in the object upon receipt of a pulse from the control circuit, the control circuit being connected to the digital coordinate value detecting station as well as the register and the operation station so that the register receives the content of the counting station at the moment the memorization instructing pulse from the control circuit is applied thereto during the time the counting station is continuing the counting operation so as to temporarily store the content of the counting station therein and the content temporarily stored in the register is transferred to the operation station simultaneously with the supply of the reference datum thereto from the reference data setting station by the application of the operation and memorization instructing pulse applied thereto from the control circuit within the time period until the next pulse is supplied from the measuring point detecting station so that the content transferred to the operation station is compared with the reference datum so as to obtain the error or the deviation of the measured value from the reference datum, and the thus obtained error is successively recorded in the recording station.

In accordance with another feature of the present invention, various measuring point detecting stations and various coordinate value detecting stations for the measurement of the length or the angle or other values relating to an object to be measured may be interchangeably connected to the control circuit so that the measuring and recording device is used for various purposes, thereby permitting the device of the present invention to be rendered to be a multi-purpose or universal measuring and recording device.

BRIEF DESCRIPTION OF THE DRAWINGS

FIG. 7 is a block diagram showing the various connections of the measuring and recording device interchangeably used for the various purposes.

DETAILED DESCRIPTION OF THE PREFERRED EMBODIMENT

Figure 1:
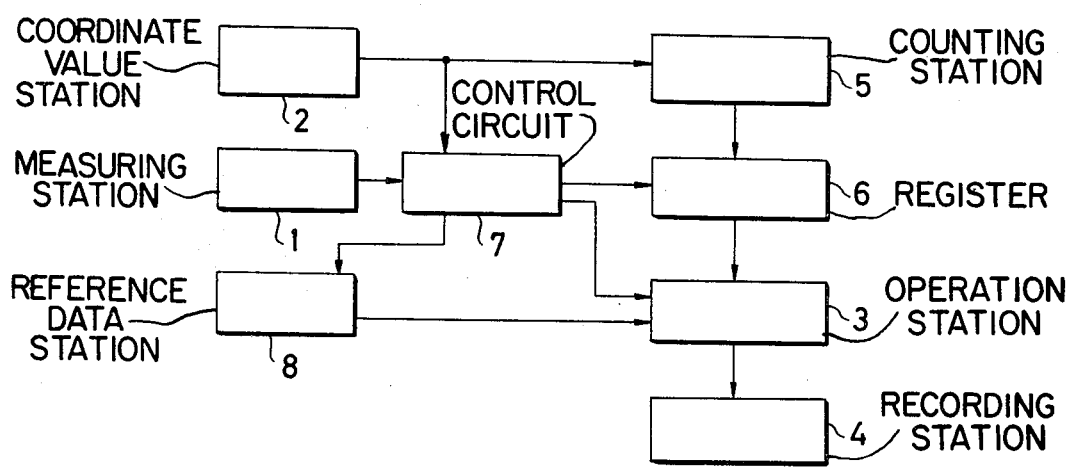
FIG. 1 is a block diagram showing the schematic construction of the operating system of the automatic measuring and recording device constructed in accordance with the present invention.

Referring to FIG. 1, a measuring point detecting station 1 is shown as being connected to a control circuit 7 so as to supply an output pulse thereto while a coordinate value detecting station 2 is connected to the control circuit 7 as well as to a counting station 5 so that output pulses thereof are supplied to the counting station 5 as well as to the control circuit 7.

The output of the counting station 5 is connected to a register 6 the output of which is in turn connected to an operation station 3 connected to a recording station 4. The output of the control circuit 7 is connected to the register 6, the operation station 3 and a reference data setting station 8 the output of which is connected to the operation station 3. The reference data setting station 8 is, for example, in the form of tape reader or a card reader which, upon receipt of a signal from the control circuit, a reference datum desired to be compared with the measured value of the object is set in the station 8 and supplied to the operation station 3 so that the error or the deviation of the measured value of the object is obtained each time the measurement is effected.

The measuring point detecting station 1, the coordinate value detecting station 2, the operation station 3 and the recording station 4 serve as the four functions, respectively, referred to in items (1) to (4) previously described.

By the connection of the elements as described above, the output pulse of the measuring point detecting station 1 and the output pulses of the coordinate value detecting station 2 are supplied to the control circuit 7 and the output pulse of the coordinate value detecting station 2 is also supplied to the counting station 5 so as to be counted therein. The memorization instructing signal generated in the control circuit 7 in response to the pulses supplied thereto from the stations 1 and 2 is supplied to the register 6 so that the content of the counting station 5 existing therein at the moment the memorization instructing pulse is supplied to the register 6 is transferred to the register 6 so as to be temporarily stored therein. The operation and recording instructing pulse generated in the control circuit 7 within the time period until the next pulse is supplied from the measuring point detecting station 1 is supplied to the operation station 3 and the reference data setting station 8 so that the content temporarily stored in the register 6 is transferred to the operation station 3 while a reference datum to be compared with the thus transferred content is supplied from the reference data setting station 8 to the operation station 3. Thus, the content transferred to the operation station is compared with the reference datum, and the error or the deviation obtained by the comparison is supplied to the recording station 4 so as to be recorded therein.

The construction of each of the detecting stations 1, 2, the operation station 3, the recording station 4, the counting station 5, the register 6 and the reference data setting station 8 per se is well known, and therefore, is not described here in detail. To know the detailed construction of each of the above elements, reference should be had to U.S. Pat. No. 2,954,266 (for the detecting stations 1, 2, the recording station 4 and the counting stations 5), "Pulse and Digital Circuits" of McGraw-Hill Electrical and Electronic Engineering Series written by Jacob Millman, Ph.D. and Herbert Taub, Ph.D. and published by McGraw-Hill Book Company, Inc. in 1956, particularly on pages 329 and 330 and in chapter 13 on page 392 and from below (for the operation station 3) and on pages 411 to 414 (for the register 6), and U.S. Pat. No. 3,476,481 (for the reference data setting station 8).

In the device of the present invention, the register 6 serves to perform a buffering function between the pulses generated by the measuring point detecting station 1 and the coordinate value detecting station 2 which are related to the mechanical positions of the stations 1 and 2 and the clock pulses generated in the operation station 3 and the recording station 4 by virtue of the fact that the content transferred to the register 6 from the counting station 5 is stored in the register 6. In other words, the content obtained in the counting station 5 corresponding to the position detected by the measuring point detecting station 1 is temporarily stored in the register 6 while the actuation of the measuring and recording device is continuing, so that the counting station 5 continues the counting of pulses successively supplied thereto, whereas the content thus stored in the register 6 is kept unchanged until the next memorization instructing signal is issued from the measuring point detecting station 1 so that it is made possible to carry out the operation of the operation station 3 to obtain the error or the deviation of the measured value from the reference datum and the recording operation of the recording station 4 during the time period until the next pulse is issued from the measuring point detecting station 1 by means of clock pulses generated therein which are quite independent from the pulses generated in the measuring point detecting station 1 and the coordinate value detecting station 2.

As described above, the control circuit 7 generates a memorization instructing pulse for operating the register 6 to temporarily store the content transferred from the counting station 5 by the medium of the pulse issued from the measuring point detecting station 1. However, this circuit serves also to synchronize the operations of the above described measuring point detecting station 1, the coordinate value detecting station 2, the operation station 3 and the recording station 4 without causing any confusion between the operations of the respective elements so that the operations are carried out in order.

Assuming that the interval of the successive two pulses of the coordinate value detecting station 2 to be T and the time required for the counting operation of the counting station 5 (including the shifting of figure, which is usually several $\mu$sec.) to be $T_1$, then the counting operation of the counting station 5 is ceased during the time $T_2 = T - T_1$. Therefore, the content obtained in the counting station 5 can be transferred to the register 6 without causing any disturbance to the operation of the counting station 5 if the memorization instructing signal is supplied to the register 6 within the time period $T_2 = T - T_1$.

Figure 2:
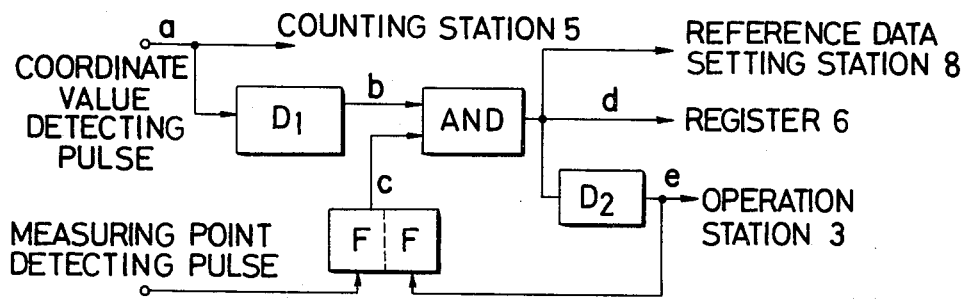
FIG. 2 is a diagram showing an example of the connection of the control circuit incorporated in the automatic measuring and recording device of the present invention.

FIG. 2 shows an example of the control circuit 7 of the present invention. The control circuit shown in FIG. 2 comprises a delay circuit $D_1$ adapted to receive the coordinate value detecting pulses $a$ from the coordinate value detecting station 2 and generate output pulses $b$ which are delayed by a time longer than the time $T_1$ and an and-circuit AND connected to the output of the delay circuit $D_1$, the output $d$ of which is in turn supplied to the register 6 and the reference data setting station 8, a flip-flop FF adapted to receive the measuring point detecting pulse from the measuring point detecting station 1 and connected to the input of the and-circuit AND so as to supply the output $c$ thereof to the and-circuit AND, and another delay circuit $D_2$ connected to the output $d$ of the and-circuit AND and generating an output $e$ which is supplied to the operation station 3, the output $e$ of the delay circuit $D_2$ being connected to the flip-flop FF so as to reset the flip-flop FF.

Thus, the output pulses $b$ generated by the delay circuit $D_1$ in response to the coordinate value detecting pulses $a$ are delayed by a time longer than the time $T_1$ and the thus delayed output pulses $b$ and the output $c$ of the flip-flop FF which is inverted by the application of the measuring point detecting pulse are supplied together to the and-circuit AND and the output $d$ thereof is supplied to the register 6 and the reference data setting station 8 so as to operate the register 6 and the reference data setting station 8. Since the operation instructing signal is required to be issued after the shifting operation of the register 6 has been completed, the output $d$ is supplied to the operation station 3 through the delay circuit $D_2$ which generates a delayed output pulse $e$ to be supplied to the operation station 3 so that the required delay of the signal is achieved. The output pulse $e$ is also used to reset the flip-flop FF thereby permitting the control circuit 7 to be returned to the initial condition each time one cycle of operation is completed.

Figure 3:
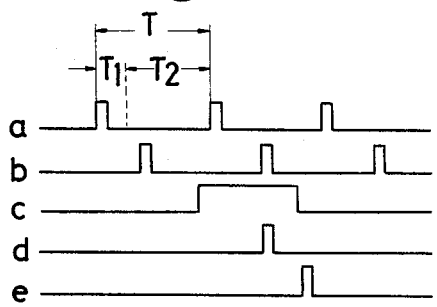
FIG. 3 is a diagram showing the various wave forms generated in the control circuit shown in FIG. 2.

FIG. 3 shows the various wave forms of the pulses $a$, $b$, $c$, $d$ and $e$ with the lapse of time indicated by the abscissa. Thus, the control circuit 7 and the register 6 and the reference data setting station 8 connected as shown in FIG. 1 make it possible to cooperate with the measuring point detecting station 1, the coordinate value detecting station 2, the operation station 3 and the recording station 4 so as to achieve the synchronization therebetween.

When the above described device is to be applied to a toolmaker's microscope, for example, a photoelectric detecting means for detecting the measuring reference point is attached to the microscope of the well known type and a digital detecting means such as moiré fringe detecting means is mounted on the microscope. Those detecting means mounted on the microscope are connected to the control circuit 7 and the counting station 5 as shown in FIG. 1. The photoelectric detecting means may be embodied in various different configuration according to the shape of the object to be measured.

Figure 4:
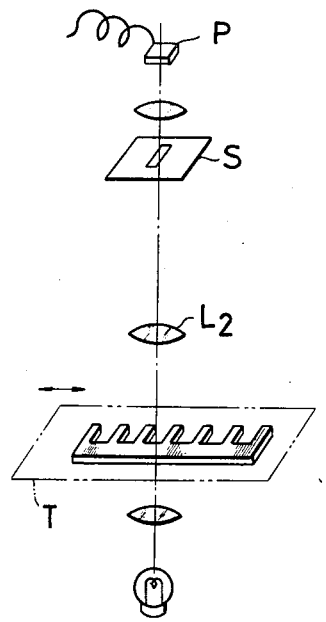
FIG. 4 is a schematic perspective view showing the manner in which the measuring and recording device of the present invention is operated for measuring the pitch of the teeth of a comb-shaped object.

For instance, when a comb-shaped object as shown in FIG. 4 is to be measured, a thin elongated slit S is placed in the focal plane of the objective lens $L_2$. When the table T carrying thereon the comb-shaped object is moved in the direction indicated by the arrow in the figure, the quantity of light passing through the slit S varies each time the image of the respective edges of one of the teeth of the object passes through the slit S. The thus varied quantity of light from the object is received by a photoelectric element P through a lens serving to focus the light on the photoelectric element P thereby permitting the variation in the quantity of light to be transformed to the variation in the electric quantity which is amplified and transformed into a rectified wave form so as to serve as the measuring point detecting pulse.

Figure 5:
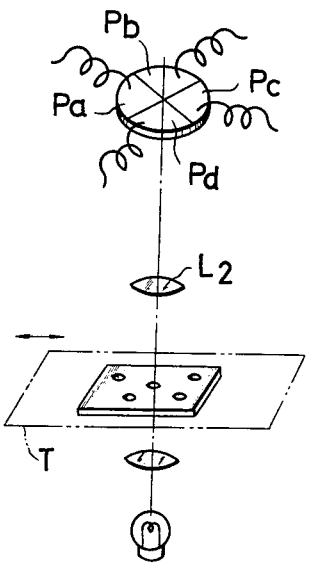
FIG. 5 is a view similar to FIG. 4 but showing the manner for measuring the position of various holes formed in an object to be measured.

Alternatively, when the spacing between a plurality of holes formed in a plate is to be measured as shown in FIG. 5, means for detecting the center of each of the holes is used. Such a means comprises two pairs of photoelectric elements Pa, Pc and Pb, Pd having the same performances with each pair being located at diametrically opposed positions with respect to the optical axis of the microscope and with one pair Pa, Pc located parallel to the direction of the arrow in FIG. 5 while the other pair Pb, Pd is located perpendicular thereto so that four regions are provided symmetrically around the optical axis in the focal plane of the objective lens $L_2$. Thus, when the object is moved in the direction of the arrow indicated in the figure so as to move one of the holes across the optical axis and the output of the photoelectric element Pa is made equal to that of the photoelectric element Pc, it indicates that the center of the hole is located in the line passing through the optical axis and extending in the direction perpendicular to the direction of the arrow. Similarly, when the output of the photoelectric element Pb is made equal to that of the photoelectric element Pd as the object is moved in the direction perpendicular to the direction of the arrow, then it indicates that the center of the hole is located in the line passing through the optical axis and extending in the direction of the arrow. Therefore, when the outputs of all the four photoelectric elements Pa, Pb, Pc, Pd are made equal to each other, then the center of the hole coincides with the optical axis. The measuring point detecting station 1 is so set that it generates a measuring point detecting pulse when the center of the hole coincides with the optical axis.

As shown in the embodiments in FIGS. 4 and 5, when an appropriate electric circuit is used in combination with the photoelectric elements shown in FIG. 4 or 5, an output is obtained in the form of an electric pulse. If the wave form, the voltage and the impedance and the like are preliminarily set at appropriate values, the electric pulse is used as the measuring point detecting pulse generated by the measuring point detecting station 1 shown in FIG. 1. Thus, the device of the invention can be used in various purposes by interchangeably connecting one of the various kinds of the electric pulses obtained in the different measurements to one and the same control circuit 7 shown in FIG. 1.

Figure 6:
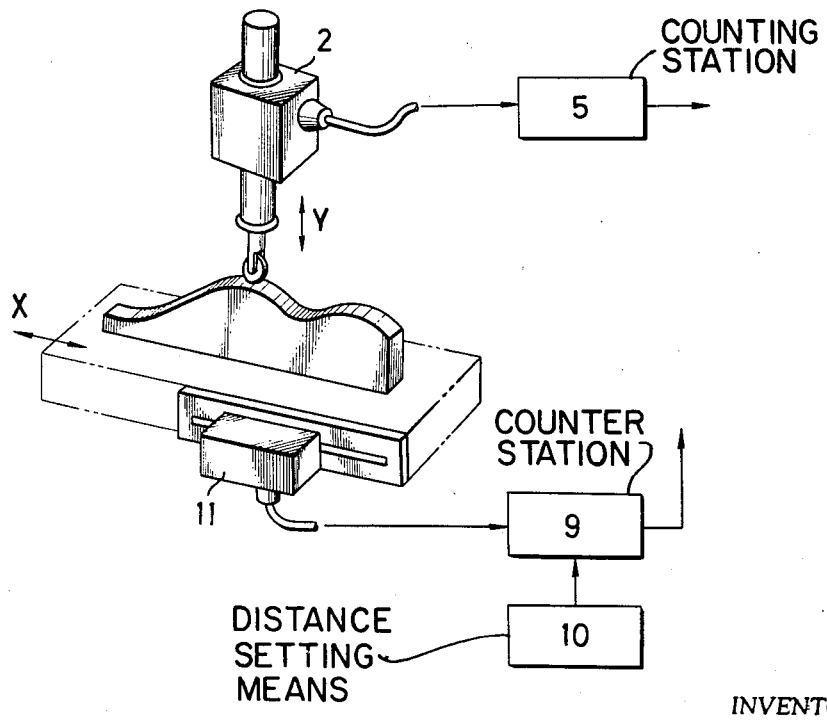
FIG. 6 is a perspective view showing the manner in which the measuring and recording device of the present invention is operated for measuring the configuration of a cam plate.

In case the configuration of a cam plate is to be measured as shown in FIG. 6, the cam plate is placed on the table in parallel to the direction $x$ of the movement of the table as shown so as to be moved in the direction of the $x$ together with the table, and the coordinate value detecting station 2 is located above the cam edge of the cam plate so that the feeler of the station 2 contacts with the cam edge of the cam plate so as to be moved in the direction indicated by the arrow $y$ perpendicular to the direction $x$. A digital detecting station 11 for detecting the amount of the movement of the table in the direction $x$ is provided adjacent to one side of the table so as to cooperate therewith. Thus, the coordinate values $x$ and $y$ are detected by the stations 2 and 11.

When the coordinate value $y$ is to be measured each time the table moves a predetermined distance in the direction $x$, distance setting means 10 is connected to a counting station 9 which is connected to the detecting station 11 so that an output pulse is generated by the counting station 9 each time the counting thereof reaches the value set in the distance setting means 10. This output pulse is supplied to the control circuit 7. As is clear from the example shown in FIG. 6, the device of the present invention may be used by supplying an output signal obtained from a separate digital measuring device thereby permitting the device of the present invention to be broadly used in various applications.

Either one or both of the stations 2 and 9 may be replaced by digital measuring devices for detecting the angle instead of the length. Thus, it is made possible by the device of the present invention to measure various objects such as a cylindrical cam, a gear and the like and to measure the length in combination with the angle.

FIG. 7 shows a general arrangement of the present invention similar to FIG. 1.

The elements shown by the dotted lines can be interchangeably connected as shown so that the device of the present invention can be broadly used in various applications.

The register 6 may be made a universal type and may be connected to the recording station 4 directly or to a pen-writing recorder through a digital-analog transformer so as to obtain a graph of the measured values thereby permitting the existing recording devices to be used in combination with the device of the present invention.

A separate digital measuring device adapted to generate an output pulse by means of a reference data setting device at the moment the content obtained in the digital measuring device reaches a predetermined value which is set in the reference data setting device may be connected to the control circuit, so that the output pulse of the separate measuring device is applied to the control circuit so as to operate the automatic measuring and recording device.

We claim:

1. An automatic measuring and recording device capable of measuring and recording a measured value such as the length and the angle of an object which device comprises in combination:

(A) a counting station and a digital coordinate value detecting station connected thereto, said counting station having means for counting pulses supplied from said detecting station, and means for generating pulses indicative of the coordinate value to be measured;

(B) a register connected operatively to said counting station and having means to temporarily store content data obtained in said counting station;

(C) a measuring point detecting station connected to a control circuit, said control circuit having means to be supplied with a pulse received from said measuring point detecting station each time a measuring point is detected, said pulse received from said detecting station providing to provided means in the control circuit, a memorization instructing pulse and an instructing pulse in timely coordinated relationship with said counting pulse supplied from the detecting station;

(D) an operation station connected to a recording station with means joining the the control circuit; and (E) a reference data setting station connected to said operation station and to the control circuit;

(F) said control circuit being connected for communication with said digital coordinate value station, said measuring station, the register, reference data station and the operation station;

(G) said operation station and said reference data station disposed such that said register is supplied with the content of said counting station at the moment the instruction pulse from the control circuit is applied thereto during the time said counting station is continuing the counting operation so as to temporarily store the content of the counting station therein;

(H) said content stored in the register being transferred through communications means to the operation station while reference datum is supplied by the instructing pulse from the control circuit within the time period until the next pulse is supplied from the measuring point detecting station; and (I) recording means in the recording station permitting error or deviation of the measured value from the reference datum obtained by comparing the content transferred from the register with said reference datum in the operation station to be recorded.

2. Device according to claim 1, wherein said control circuit comprises a first delay circuit connected to said coordinate value detecting station and having a delay time longer than the time required for the counting operation in said counting station, an AND-circuit connected to the first delay circuit, a second delay circuit connected to the output of said AND-circuit, and a flip-flop connected to said measuring point detecting station with the output thereof being connected to the input of said AND-circuit, the output of said AND-circuit being connected to said register and said reference data setting station while the output of said second delay circuit is connected to said operation station as well as said flip-flop, thereby permitting said AND-circuit to supply the instructing pulse to said register as well as to said reference data setting station after the delay time with respect to the pulses supplied from said coordinate value detecting station without disturbing the counting operation of said counting station while said operation station is supplied with the instructing pulse after the operation of said register is completed, the content transferred from said register being compared with said reference datum supplied to said operation station permitting the error or deviation of the measured value from said reference datum to be obtained in said operation station, said flip-flop being reset each time an output is issued from said second delay circuit.

3. The device of claim 1 wherein a multiple number of measuring point detecting stations are included.

4. The device of claim 1 wherein a digital measuring device is in communication with a counter station, said counter station connected to the control circuit, said digital measuring device having means for generating an output pulse at predetermined value, said output pulse being supplied to the control circuit.

References Cited

UNITED STATES PATENTS

| | | | |
|---|---|---|---|
| 2,954,266 | 9/1960 | Danielson et al. | 356—167 |
| 3,180,995 | 4/1965 | Briggs et al. | 250—223 |
| 3,267,264 | 8/1966 | Burk et al. | 235—151.1 |
| 3,476,481 | 11/1969 | Lemelson | 356—167 |
| 3,502,415 | 3/1970 | Hock | 356—167 |
| 2,837,198 | 6/1958 | Griffin | 356—167 |

GARETH D. SHAW, Primary Examiner

U.S. Cl. X.R.

356—167; 235—151.1